(12) United States Patent
Yuge

(10) Patent No.: US 11,498,837 B2
(45) Date of Patent: Nov. 15, 2022

(54) METHOD FOR SHORTENING FIBROUS CARBON NANOHORN AGGREGATE AND SHORTENED FIBROUS CARBON NANOHORN AGGREGATE

(71) Applicant: NEC CORPORATION, Tokyo (JP)

(72) Inventor: Ryota Yuge, Tokyo (JP)

(73) Assignee: NEC CORPORATION, Tokyo (JP)

( * ) Notice: Subject to any disclaimer, the term of this patent is extended or adjusted under 35 U.S.C. 154(b) by 230 days.

(21) Appl. No.: 16/772,567

(22) PCT Filed: Nov. 28, 2018

(86) PCT No.: PCT/JP2018/043752
§ 371 (c)(1),
(2) Date: Jun. 12, 2020

(87) PCT Pub. No.: WO2019/116893
PCT Pub. Date: Jun. 20, 2019

(65) Prior Publication Data
US 2020/0392002 A1 Dec. 17, 2020

(30) Foreign Application Priority Data
Dec. 13, 2017 (JP) .............................. JP2017-238554

(51) Int. Cl.
*C01B 32/18* (2017.01)
*B01J 37/14* (2006.01)
(Continued)

(52) U.S. Cl.
CPC ............... *C01B 32/18* (2017.08); *B01J 37/14* (2013.01); *B01J 37/34* (2013.01); *H01G 11/36* (2013.01);
(Continued)

(58) Field of Classification Search
CPC ..... C01B 32/18; C01B 32/152; C01B 32/158; C01B 32/182; C01B 32/20; C01B 32/159;
(Continued)

(56) References Cited

U.S. PATENT DOCUMENTS

2007/0003469 A1 1/2007 Azami et al.
2007/0265379 A1* 11/2007 Chen ........................ C08K 7/24
524/495
(Continued)

FOREIGN PATENT DOCUMENTS

JP 2002-159851 A 6/2002
JP 2013-537610 A 10/2013
(Continued)

OTHER PUBLICATIONS

Yuge, et al., Preparatation and Characterization of Newly Discovered Fibrous Aggregates of Single-Walled Carbon Nanohorns, Adv. Mater. 2016; 28: 7174-7177 (Year: 2016).*
(Continued)

*Primary Examiner* — Daniel C. McCracken
(74) *Attorney, Agent, or Firm* — Sughrue Mion, PLLC

(57) ABSTRACT

Provided is a shortened fibrous carbon nanohorn aggregate (CNB) obtained by shortening a CNB having a length of 1 μm or more and a diameter in the short direction in the range of 30 to 100 nm, by oxidizing, stirring in an acid solution, subjecting to an ultrasonic treatment in a liquid, followed by cutting. The shortened CNB has an end surface on which no tip of the plurality of single-walled carbon nanohorns is disposed toward the longitudinal direction at least one end in the longitudinal direction, and has an excellent dispersibility by shortening the length to less than 1 μm.

20 Claims, 6 Drawing Sheets

(51) Int. Cl.
*B01J 37/34* (2006.01)
*H01G 11/36* (2013.01)
*H01M 4/583* (2010.01)
*H01M 4/96* (2006.01)
*C01B 32/152* (2017.01)
*C01B 32/182* (2017.01)
*C01B 32/158* (2017.01)
*C01B 32/20* (2017.01)

(52) U.S. Cl.
CPC .............. *H01M 4/583* (2013.01); *H01M 4/96* (2013.01); *C01B 32/152* (2017.08); *C01B 32/158* (2017.08); *C01B 32/182* (2017.08); *C01B 32/20* (2017.08); *C01P 2004/50* (2013.01)

(58) Field of Classification Search
CPC ..... C01B 32/16; C01B 32/162; C01B 32/164; C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B01J 37/14; B01J 37/34; H01G 11/36; H01G 11/38; H01G 11/50; H01G 11/06; H01M 4/583; H01M 4/96; H01M 4/587; H01M 4/625; H01M 4/9083; C01P 2004/50; Y02E 60/10; Y02E 60/50; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133

See application file for complete search history.

(56) References Cited

U.S. PATENT DOCUMENTS

| | | |
|---|---|---|
| 2012/0202060 A1 | 8/2012 | Yuge et al. |
| 2013/0199627 A1 | 8/2013 | Gilbert |
| 2016/0211434 A1 | 7/2016 | Kano |

FOREIGN PATENT DOCUMENTS

| | | |
|---|---|---|
| JP | 2015-070249 A | 4/2015 |
| JP | 6179678 B2 | 8/2017 |
| WO | 2004/103902 A1 | 12/2004 |
| WO | 2011/046157 A1 | 4/2011 |
| WO | 2016/147909 A1 | 9/2016 |
| WO | 2016/208170 A1 | 12/2016 |
| WO | 2015/186742 A1 | 4/2017 |
| WO | 2017/159351 A1 | 9/2017 |

OTHER PUBLICATIONS

Zhu, et al., Determination of concentrated hydrogen peroxide at single-walled carbon nanohorn paste electrode, Electrochemistry Communications 2008; 10: 695-698 (Year: 2008).*

Japanese Office Communication for JP Application No. 2019-559533 dated Aug. 3, 2021 with English Translation.

Jie Liu et al., "Fullerene Pipes", Science, May 22, 1998, pp. 1253-1256, vol. 280.

Minfang Zhang et al., "Individual Single-Wall Carbon Nanohorns Separated from Aggregates", The Journal of Physical Chemistry C, 2009, pp. 11184-11186, vol. 113, No. 26.

International Search Report for PCT/JP2018/043752 dated Feb. 12, 2019 [PCT/ISA/210].

* cited by examiner

METHOD FOR SHORTENING FIBROUS CARBON NANOHORN AGGREGATE AND SHORTENED FIBROUS CARBON NANOHORN AGGREGATE

CROSS REFERENCE TO RELATED APPLICATIONS

This application is a National Stage of International Application No. PCT/JP2018/043752 filed Nov. 28, 2018, claiming priority based on Japanese Patent Application No. 2017-238554 filed Dec. 13, 2017, the entire disclosure of which is incorporated herein by reference.

TECHNICAL FIELD

The present invention relates to a method for shortening a fibrous carbon nanohorn aggregate, and to a shortened fibrous carbon nanohorn aggregate.

BACKGROUND ART

Carbon materials are utilized in various fields such as conductive materials, catalyst carriers, adsorbents, separators, inks, and toners. In recent years, nano-carbon materials having nano-size dimensions have attracted attention because of their excellent conductivity and large specific surface area, and typical examples include carbon nanotubes, carbon nano-horn aggregates, graphene, and the like.

In recent years, a fibrous carbon nanohorn aggregate (carbon nanobrush: CNB) in which carbon nanohorns are radially aggregated and connected in a fibrous manner has been discovered (Patent Document 1). Unlike conventional spherical aggregates, the CNB has a fibrous structure and thus is excellent in conductivity. It is also known that the specific surface area is large.

When a fibrous carbon nanohorn aggregate is used as an electrode material of an IoT (Internet of things) device and an energy device, such as a sensor, a capacitor, a battery, a fuel cell, or the like, it is preferable that the fibrous carbon nanohorn aggregate is uniformly dispersed in the electrode film in order to obtain excellent characteristics. Such an electrode film is manufactured by a method of preparing an electrode paste in which a fibrous carbon nanohorn aggregate is dispersed and applying to an electrode. Therefore, the fibrous carbon nanohorn aggregate is required to be highly dispersed in a solvent for preparing the electrode paste.

PRIOR-ART LITERATURE

Patent Document

Patent Document 1: Japanese Patent No. 6,179,678

SUMMARY OF INVENTION

Technical Problems

Although the fibrous carbon nanohorn aggregate is excellent in dispersibility compared to conventional fibrous materials such as carbon nanotubes and carbon fibers, it is not yet sufficiently high in dispersibility compared to spherical structures such as spherical carbon nanohorn aggregates because it is an elongated structure of 1 µm or more. In addition, when a fibrous carbon nanohorn aggregate is produced, spherical graphite impurities having a particle size of about 1 to 5 µm are also simultaneously produced, and both are easily entangled and granulated, and when a thin film is formed by forming a paste, convex portions are formed on the plane of the thin film.

An object of the present invention is to provide a shortened fibrous carbon nanohorn aggregate. Another object of the present invention is to provide an electrode paste containing highly dispersed fibrous carbon nanohorn aggregates.

Solution to Problem

Accordingly, as a result of intensive studies on the fibrous carbon nanohorn aggregates, the present inventor has found that the aggregate structure of the long fibrous carbon nanohorn aggregates can be shortened without impairing the aggregate structure. It has also been found that the shortened fibrous carbon nanohorn aggregate is highly dispersed when used as an electrode paste or the like.

That is, according to one aspect of the present invention, there is provided a method of shortening a fibrous carbon nanohorn aggregate including:

(1) oxidizing a fibrous carbon nanohorn aggregate in which a plurality of single-walled carbon nanohorns are aggregated radially and are connected in a fibrous manner, the fibrous carbon nanohorn aggregate having a length of 1 µm or more and a diameter in the transverse direction in the range of 30 to 100 nm;

(2) agitating the fibrous carbon nanohorn aggregate in an acid solution; and (3) subjecting the fibrous carbon nanohorn aggregate to ultrasonic treatment in a liquid after the step (2).

According to another aspect of the present invention, there is provided a fibrous carbon nanohorn aggregate in which a plurality of single-walled carbon nanohorns are radially aggregated and connected in a fibrous manner, wherein a tip end of the fibrous carbon nanohorn aggregate has a two-dimensional radial structure by single-walled carbon nanohorn.

Furthermore, according to another aspect of the present invention, there is provided a fibrous carbon nanohorn aggregate in which a plurality of single-walled carbon nanohorns are radially assembled and connected in a fibrous manner, wherein the fibrous carbon nanohorn aggregate has a length of less than 1 µm and a diameter in the transverse direction in the range of 30 to 100 nm.

In addition, according to another aspect of the present invention, there is provided a carbon nanohorn aggregate characterized in that the shortened carbon nanohorn aggregate includes a part of a seed structure, a bud structure, and a petal structure.

In addition, according to another aspect of the present invention there is provided a carbon nanohorn aggregate mixture wherein the above shortened carbon nanohorn aggregate are intermingled with at least one type of spherical carbon nanohorn aggregates of a seed-shaped, a bud-shaped, a dahlia-shaped, a petal dahlia-shaped and/or a petal-shaped one.

Moreover, one aspect of the present invention relates to an electrode paste in which the above shortened carbon nanohorn aggregate or the above carbon nanohorn aggregate mixture is dispersed in a solution.

Effects of Invention

According to one aspect of the present invention, it is possible to shorten the aggregate structure of the long fibrous carbon nanohorn aggregate without impairing, and in particular, by shortening the aggregate structure to a length of less than 1 μm, a fibrous carbon nanohorn aggregate excellent in dispersibility can be obtained. In addition, by dispersing the shortened fibrous carbon nanohorn aggregate alone or as a mixture with spherical carbon nanohorn aggregates in a solution, it is possible to obtain a highly dispersed electrode paste for use in manufacturing an electrode film.

EXAMPLE EMBODIMENTS

The present invention has the features as described above, and example embodiments will be described below.

Figure 1:
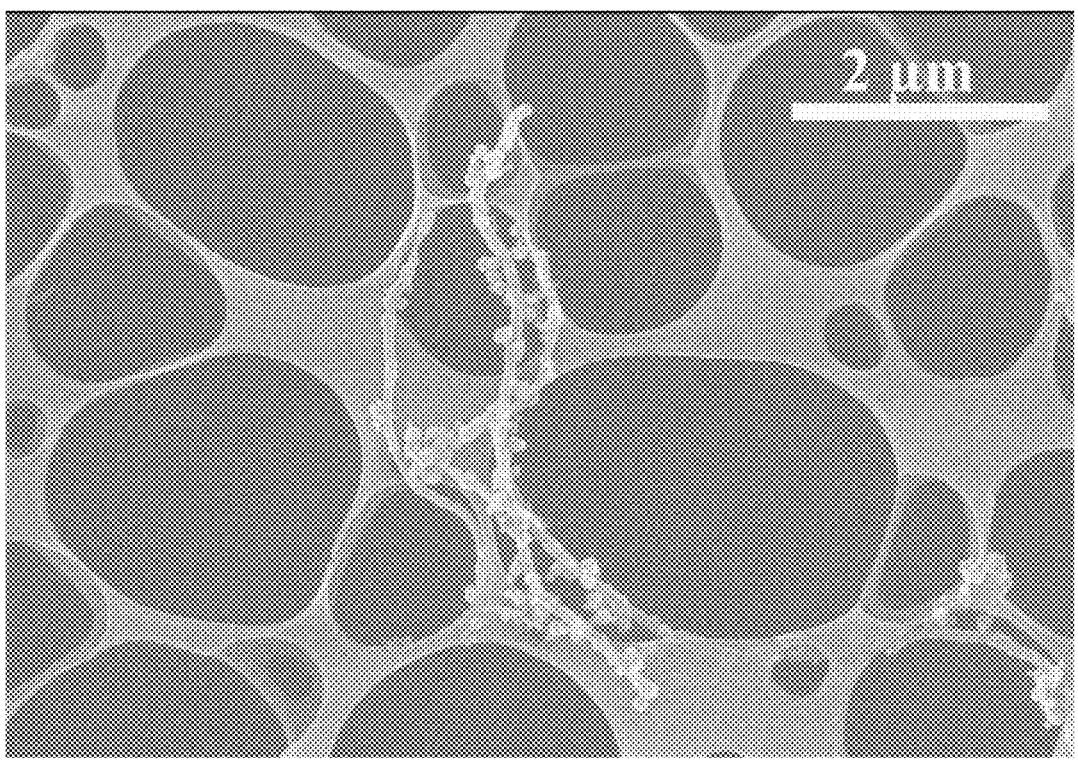
FIG. 1 is a scanning electron micrograph of an untreated fibrous carbon nanohorn aggregate.
Figure 2:
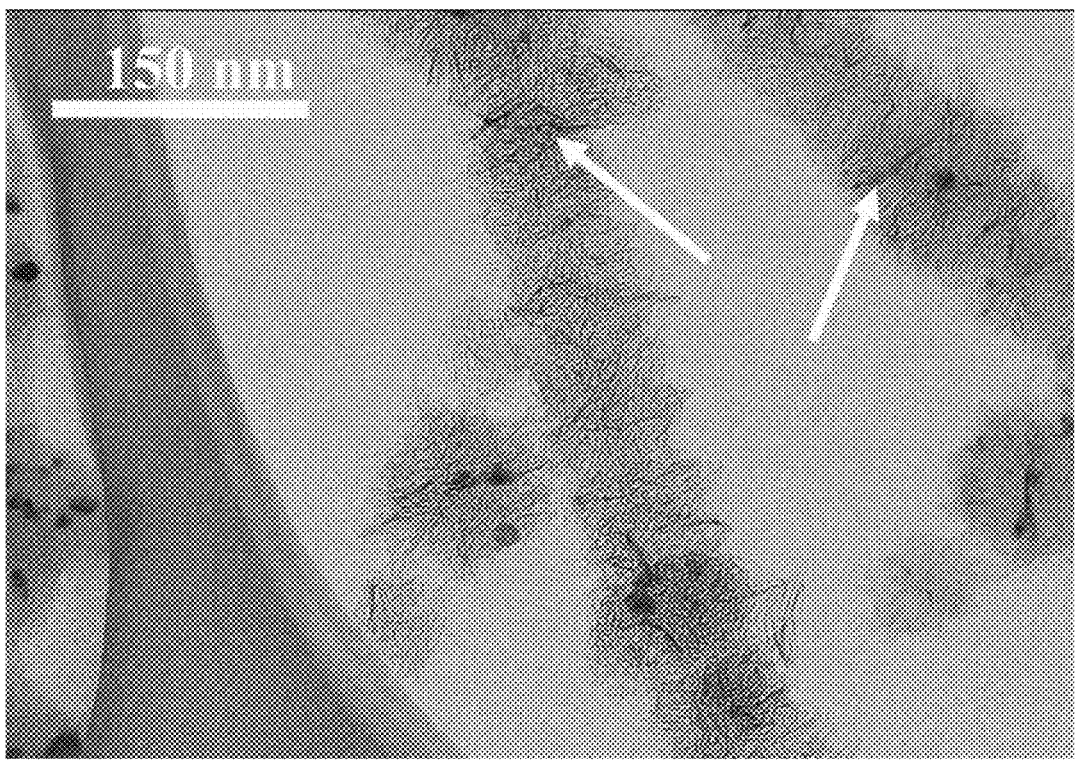
FIG. 2 is a transmission electron micrograph of an untreated fibrous carbon nanohorn aggregate.

FIGS. 1 and 2 are a scanning electron microscope image and a transmission electron microscope image of a fibrous carbon nanohorn aggregate (referred to as a long CNB) in an untreated state. As disclosed in Patent Document 1, a long CNB is a structure in which each single-walled carbon nanohorn is aggregated in a radial and fibrous manner. The structure is similar to that of a test tube brush, a braid, or the like. The single-walled carbon nanohorn has a diameter of approximately 1 nm to 5 nm and a length of 30 nm to 50 nm. The long CNB has a diameter in the transverse direction (diameter of the fibrous material, hereinafter simply referred to as diameter) of about 30 nm to 100 nm, and a length of about 1 μm to 100 μm. The interior of the long CNB also includes at least one type of carbon nanohorn aggregate: seed structure, bud structure, dahlia structure, petal-dahlia structure, and petal structure (graphene structure). In the case of seed type, there are few or no square projections on the surface, while in the case of bud type, there are some square projections on the spherical surface, in the case of dahlia type, there are many square projections on the spherical surface, and in the case of petal type, there are loose projections on the spherical surface. The petal structure is a graphene sheet structure with a width of 50 to 100 nm, a thickness of 0.34 to 10 nm, and 2 to 30 sheets. The petal-dahlia type is an intermediate structure between the dahlia type and the petal type.

As described in Patent Document 1, a method of manufacturing a long CNB is performed by a laser ablation method in which a carbon target containing a catalyst is irradiated with a laser beam. In the laser ablation method, long CNBs and spherical carbon nanohorn aggregates (referred to as CNHs) are generated simultaneously.

As the catalyst, an iron-based metal (iron (Fe), nickel (Ni), cobalt (Co)) alone or a mixture of two or three thereof can be used. In particular, Fe is preferably used alone.

It is considered that the long CNB is generated by the following generation mechanism:

(1) A catalyst-containing carbon target is rapidly heated by laser irradiation, whereby carbon and catalyst are vaporized from the target at once, and a plume is formed by high-density carbon evaporation. (2) In this case, carbon forms carbon droplets having a uniform size by collision with each other. (3) As the carbon droplets diffuse, they gradually cool and graphitization of carbon proceeds to form a tubular carbon nanohorn. At this time, carbon nanotubes also grow from the catalyst dissolved in the carbon droplets. (4) The radial structures of the carbon nanohorns are connected one-dimensionally using the carbon nanotubes as a template, and a fibrous carbon nanohorn aggregate is formed.

Figure 3:
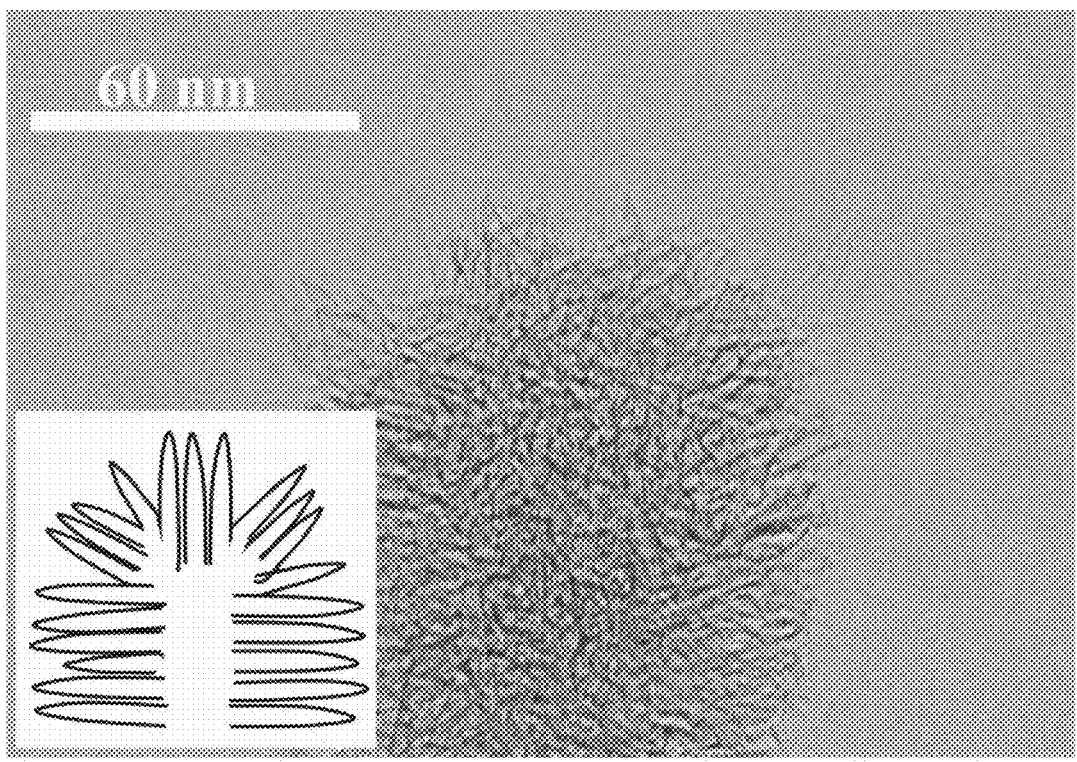
FIG. 3 is a transmission electron micrograph of the tip of the fibrous carbon nanohorn aggregate of the untreated state and a schematic view thereof.

In addition, since the long CNB is produced by evaporating the carbon target using catalyst metal, the catalyst metal (non-permeable particles in FIG. 2) exists inside the long CNB and inside a part of CNHs generated together with the long CNB. Moreover, impurities such as graphite are slightly contained. FIG. 3 is an electron microscope image of the structure of the tip portion of the long CNB. The tip is a structure in which single-walled carbon nanohoms are three-dimensionally aggregated radially.

Figure 4:
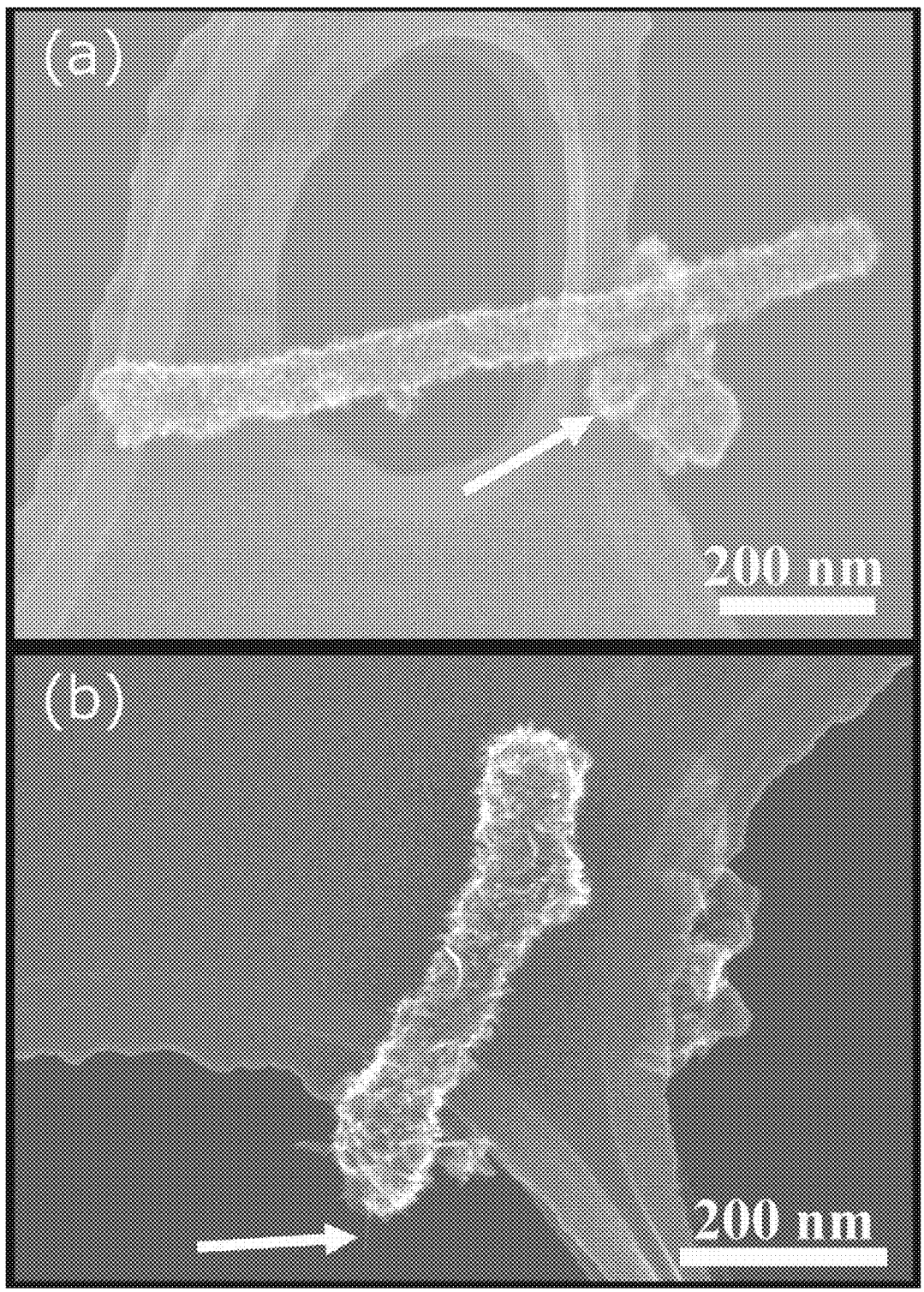
FIG. 4 is a scanning electron micrograph of a shortened fibrous carbon nanohorn aggregate produced by the present invention.
Figure 5:
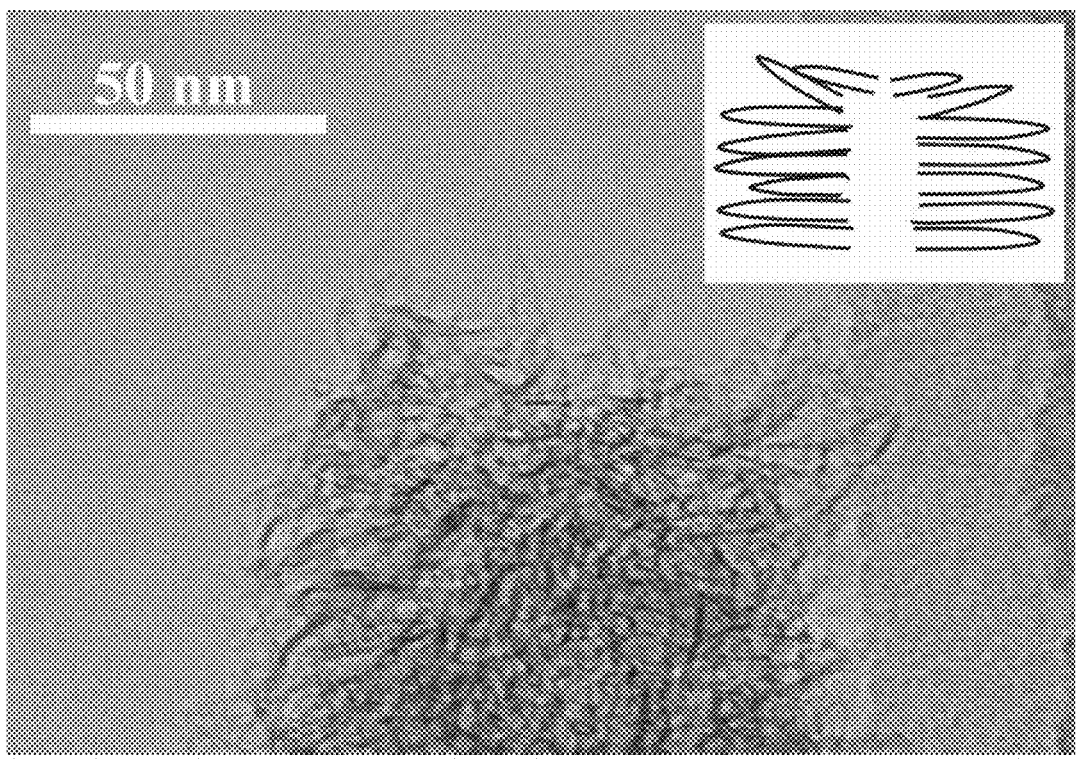
FIG. 5 is a transmission electron micrograph of a cut tip of a shortened fibrous carbon nanohorn aggregate produced according to the present invention and a schematic diagram thereof.
Figure 6:
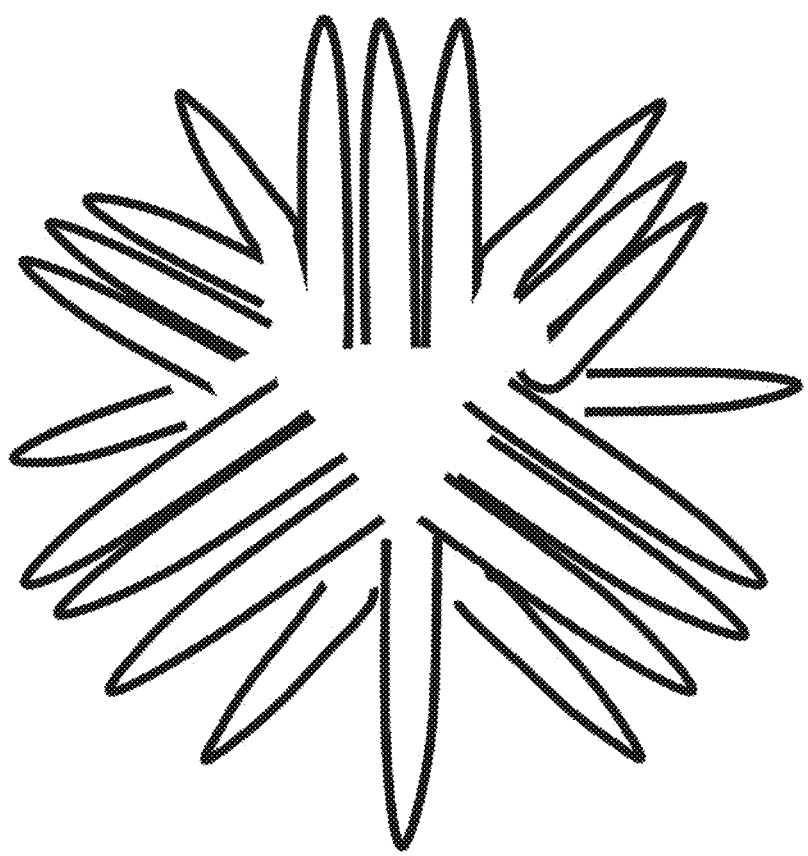
FIG. 6 is a schematic view of a cut surface of a tip portion of a shortened fibrous carbon nanohorn aggregate produced according to the present invention, as viewed from a longitudinal direction.
Figure 7:
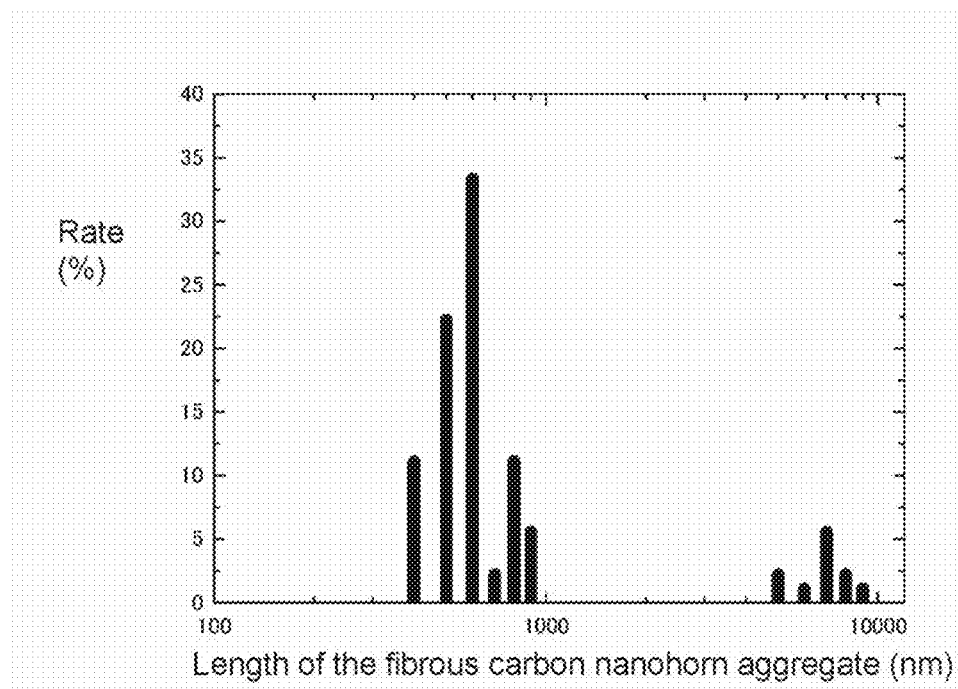
FIG. 7 is a distribution diagram of the length of a fibrous carbon nanohorn aggregate produced according to the present invention.

FIG. 4 is a scanning electron micrograph of a shortened fibrous carbon nanohorn aggregate, referred to as a short CNB, according to an example embodiment of the present invention. Its diameter is similar to that of a long CNB, and its length is less than 1 μm. Each single-walled carbon nanohorn constituting the short CNB according to the present example embodiment is substantially the same as the single-walled carbon nanohorn constituting the long CNB, but the defective portion is oxidized because ultrasonic treatment or oxidation treatment for shortening is performed. When the carbon nanotube is present at the center, the carbon nanotube may be exposed from the cut end surface. FIG. 5 is an electron microscope image of a cut tip portion of a short CNB and a schematic diagram thereof. FIG. 6 is a schematic view of the cutting surface of the distal end portion as viewed from the longitudinal direction. As shown in FIGS. 5 and 6, the tip has a two-dimensional radial structure with a single-walled carbon nanohorn. The short CNB less than 1 μm in length have high dispersibility in solutions, similar to CNHs. In this specification, the fibrous carbon nanohorn aggregates (long CNB and/or short CNB) and the spherical carbon nanohorn aggregates (CNHs) may be referred to simply as carbon nanohorn aggregates.

The produced short CNB has the following characteristics.

The diameter is approximately 30 nm to 100 nm, and the length is less than 1 μm.

The short CNB includes a portion of a graphene sheet structure.

There are end faces after cutting.

In the interior of the short CNB, at least one type of carbon nanohorn aggregate of a seed-type structure, a bud-type structure, a petal dahlia-type structure, and a petal-type structure is connected in a fibrous form.

The short CNB is intermingled with spherical carbon nanohorn aggregates of a seed-shape, a bud-shape, a dahlia-shape, a petal dahlia-shape, or a petal-shape.

The length of the short CNB is preferably 300 nm or more. By having a length of 300 nm or more, it is possible to clearly distinguish from a spherical CNHs and to express a function as a fibrous material. Further, the CNB having a length of 900 nm or less can be clearly distinguished from long CNB having a length of 1 µm or more, and is excellent in dispersibility.

The short CNB partially includes a graphene sheet structure (petal structure) included in the long CNB.

Since the short CNB is obtained from the long CNB by the shortening process, at least one of its longitudinal ends has an end face after cutting. Usually, at both ends of the long CNB, as shown in FIG. 3, a single-walled carbon nanohorn extends in the longitudinal direction thereof, and has a three-dimensional radial structure. On the other hand, on the cut end surface of the short CNB, there is no single-walled carbon nanohorn directed in the longitudinal direction, resulting in a two-dimensional radial structure. As described above, when the carbon nanotube is included in the inside, the carbon nanotube not covered with the single-walled carbon nanohorn may be exposed from the end surface. The carbon nanotubes included in the fibrous material extend in a predetermined direction around the catalyst metal, and a plurality of carbon nanotubes may grow from one catalyst particle. Multiple carbon nanotubes may be bundled and covered with single-walled carbon nanohorns. Also, carbon nanotubes grown from different catalyst particles may be bundled close to each other near their growth ends and covered with single-walled carbon nanohorns. Some ends of the long CNB remaining with a length of 1 µm or more also have end faces after cutting.

The method of manufacturing the short CNB includes the following steps.

(1) Step of oxidizing a fibrous carbon nanohorn aggregate with a length of 1 µm or more and a diameter of 30 to 100 nm, (2) step of agitating the fibrous carbon nanohorn aggregate in an acid solution, and (3) step of subjecting the dispersion of the fibrous carbon nanohorn to ultrasonic treatment in solution.

The shortening method of the present invention includes a method of cutting long CNB into at least two pieces as well as providing the short CNB. The method according to the present embodiment, also referred to as a shortening method, can shorten the long CNB without impairing the aggregate structure of the CNB. The cut end face is formed with the characteristic end face as described above.

Since the long CNB contains the metal catalyst inside, the vicinity of the catalyst is preferentially oxidized by the oxidation treatment. By dispersing in the acid solution, the catalyst is eluted, and such an eluted part is easily cut, and is cut by ultrasonic treatment.

Mechanical cutting methods that provide shear forces, such as milling, break the aggregate structure, and thus provide little short CNB that maintains the aggregate structure. Even in the method of cutting after forming the electrode film, the structure of the end face is a structure in which the aggregate structure is destroyed. Of course, it is possible to solidify the long CNB with a resin or the like, and cut the CNB without breaking the aggregate structure so that the CNB is subjected to a microscope sample or the like for viewing the cross-section thereof. However, the fibrous carbon nanohorn aggregate cut in this manner cannot be shortened to less than 1 µm with good reproducibility, and cannot be dispersed and used for various applications because it is solidified with a resin. Therefore, the short CNB (fibrous carbon nanohorn aggregate shortened to less than 1 µm) according to the present invention is in a dispersible state.

In the above step, the spherical carbon nanohorn aggregate cannot be cut, and only the fibrous structure can be cut.

The oxidation of the long CNB in the step (1) can be performed by either heat treatment under a gas atmosphere or oxidation treatment under a solution, but it is preferable to use a gas atmosphere in which the degree of oxidation is easily controlled. Oxidation under a gas atmosphere is also preferable from the viewpoint of removing carbon in the vicinity of the catalyst to expose the catalyst. Air, oxygen, carbon monoxide, or the like can be used as the atmosphere gas, but low-cost air is preferably used. The temperature of the heat treatment under the gas atmosphere is not particularly limited as long as the carbon in the vicinity of the catalyst can be burned, but the temperature in the range of 300 to 500° C. is particularly preferable. In the case of oxidation treatment under solution, hydrogen peroxide, nitric acid, and sulfuric acid can be used as the oxidizing agent, but hydrogen peroxide capable of oxidation treatment in a mild state is preferable. These oxidizing agents can be used as undiluted solution (Conc.) or by diluting them with water. In addition, the oxidation treatment under a solution can be performed by heating, and it is preferable that the solution be heated at a temperature lower than the boiling point of the solution. In this oxidation treatment, defect portions (a portion having a 5-membered ring or a 7-membered ring) at the side surface and the tip of the single-walled carbon nanohorn forming the aggregate are also oxidized, and an open hole may be formed. However, the formation of the open hole has an effect of increasing the surface area of the short CNB. Further, when the short CNB is used for a catalyst carrier or the like, a catalyst can be held inside the short CNB through the opening portion.

After the oxidation treatment of step (1), a step of agitating in the acid solution of step (2) is performed. When an acid solution such as sulfuric acid or nitric acid is used in step (1), step (1) and step (2) may proceed simultaneously. In order to effectively remove carbon in the vicinity of the catalyst in step (1), it is preferable that the step (1) and step (2) do not proceed simultaneously. In step (2), the catalyst (metal) exposed from the long CNB is removed by acid. Examples of the acid used include nitric acid, sulfuric acid, hydrochloric acid, and the like, but hydrochloric acid is suitable from the viewpoint of ease of use. The temperature at which the catalyst is dissolved can be appropriately selected, but in the case of sufficiently removing the catalyst, it is preferable to heat the catalyst to 70° C. or higher. After step (2), the adhering acid is preferably removed by neutralization, washing with water, or the like. After washing with water, the long CNB may be filtered or may be subjected to the next step (3) in the form of an aqueous dispersion without filtration.

The ultrasonic treatment in step (3) is performed by dispersing the long CNB which has undergone step (2) in a liquid. At this time, a bath type for applying ultrasonic waves from the outside of the container holding the liquid, a chip type processing apparatus for inserting a chip type oscillator into the container, or the like can be used, but a bath type which is simple and does not mix impurities is preferable. The frequency and the processing time can be appropriately set, but the frequency is preferably 28 kHz to 100 kHz and the processing time is preferably 5 minutes to 30 minutes. By the ultrasonic treatment, the long CNB is cut (divided) at the portion at which the catalyst is removed, and short CNBs are obtained. The position where the catalyst is contained is random, and the length is not less than the prescribed 1 µm, and a long CNB having a length of 1 µm or more may remain.

The obtained short CNB can be improved in crystallinity by heat treatment in an inert gas, a hydrogen gas, or a vacuum. The heat treatment temperature for improving the crystallinity can be 800 to 2000° C., but is preferably 1000 to 1500° C. In addition, the surface functional group formed by the oxidation treatment or the ultrasonic treatment can be removed by this heat treatment. The heat treatment temperature for removing the surface functional group can be 150 to 2000° C. To remove C—O bonds and O—H bonds in carboxyl groups, hydroxyl groups, and the like as surface functional groups, about 150° C. to 600° C. is preferable. In order to remove the C=O bond in the carbonyl group or the like as the surface functional group, it is preferable that the temperature is 600° C. or higher. The C=O bond in the carboxyl group may be removed even at a temperature of 600° C. or less. The surface functional group can be removed by reduction. The reduction can be performed under a gaseous atmosphere, such as hydrogen gas, or a liquid atmosphere, such as hydrazine.

In the shortening process, as described above, a long CNB having a length of 1 µm or more may remain. The short CNB can be used as an electrode material or the like while containing the long CNB remaining at a length of 1 µm or more, or by isolating the short CNB from the long CNB remaining at a length of 1 µm or more. The shortening process can be performed after the long CNB and CNHs are mixed or after the long CNB and CNHs are separated. Although CNHs may be partially oxidized by removing the catalyst contained therein by the shortening treatment, another CNHs containing no catalyst is substantially unaffected and the structure can be maintained. After the shortening treatment, a mixture of the short CNB, the long CNB, and/or CNHs (hereinafter, referred to as an aggregate mixture) is formed. The short CNB can be isolated from the aggregate mixture, or the aggregate mixture can be subjected to the following uses. These can be separated using a centrifugal separation method or a difference in sedimentation rate after being dispersed in a solvent.

The electrode material can be used as a nanocarbon complex in which one or plural kinds of carbon nanotubes, carbon fibers, graphene, carbon black, fullerenes, graphite and amorphous carbon are mixed in the short CNB or the aggregate mixture. In addition, long CNBs and/or CNHs may be added separately. The short CNB or aggregate mixture can be used as a catalyst or catalyst support as it is. Such an electrode material, a catalyst, or the like can be used as an electrode material or a catalyst of a sensor, a lithium ion battery, a fuel cell, an electrochemical actuator, an electric double layer capacitor, a lithium ion capacitor, an organic radical battery, a solar cell, an air battery, a sulfur battery, or the like.

When used as an electrode material, the electrode paste can be prepared by dispersing the short CNB, aggregate mixture, or nanocarbon complex in a solvent, and coated on a suitable substrate to form the electrode paste. As the solvent, any dispersible solvent can be used, but a solvent such as water, alcohols, ketones, ethers, and esters can be preferably used. Particularly alcohols, especially ethanol, are preferable because they are excellent in safety and drying after application proceeds quickly. Various dispersing aids, for example, surfactants, may be added as necessary. In addition, a known additive added to the electrode material may be added as necessary.

The short CNB and aggregate mixture can form a thin film without a binder, and the adhesion to the base material is good, but the electrode film may contain a binder component. In the present embodiment, it is possible to reduce the amount of the binder as compared with the conventional carbon material, and it is possible to suppress a decrease in conductivity due to an increase in the amount of the binder. On the other hand, by containing the binder component, the adhesion to the base material, the strength of the electrode film itself, and the stability of the electrode solution paste can be improved.

As the binder component, silicone rubber, urethane rubber, fluorine rubber, butyl rubber, ethylene propylene rubber, polyethylene, chlorosulfonated polyethylene, natural rubber, isoprene rubber, butadiene rubber, polystyrene, styrene-butadiene rubber, acrylic rubber, nitrile rubber, polyvinyl acetate, polyvinyl chloride, polymethyl methacrylate, or the like can be used, and these can be used alone or in combination of two or more kinds. In addition, a crosslinker, a vulcanization accelerator, a vulcanization aid, a plasticizer, a softening agent, or the like for the binder component may be added.

EXAMPLE

The following examples illustrate the present invention in more detail. Of course, the present invention is not limited by the following examples.
(Example of Manufacturing a Long CNB)

A carbon target containing iron in 1 atomic % was ablated with $CO_2$ laser under a nitrogen-atmosphere to produce a fibrous carbon nanohorn aggregate and a spherical carbon nanohorn aggregate (FIGS. 1 and 2). Details of the experiment are shown below.

The carbon target containing 1 atomic % iron was rotated at 1 rpm. $CO_2$ laser was continuously irradiated with an energy density of 200 kW/cm$^2$, and the chamber temperature was room temperature. The gas flow rate in the chamber was adjusted to 10 L/min. The pressure was controlled to 933.254 to 1266.559 hPa (700-950 Torr).

From the scanning electron micrographs and transmission electron micrographs of FIGS. 1 and 2, fibrous and spherical materials are observed. The fibrous material has a diameter of approximately 30 to 100 nm and a length of a few µm to a few tens of Many of the spherical materials were approximately uniformly sized in the range of about 30 to 150 nm in diameter. The observation results in FIG. 2 show that the fibrous material is composed of single-walled carbon nanohorns having a diameter of 1 to 5 nm and a length of about 30 to 50 nm assembled in a fibrous form. In addition, some of the petal structures (directions of arrow in FIG. 2) were also observed to be included in the interior of the fibrous carbon nanohorn aggregate. As a result of analyzing black particles by EDX (Energy Dispersion X-ray Spectroscopy), carbon and iron were mainly detected. The iron particles were abundant in the center of the aggregate, but were also present off-center. FIG. 3 is a transmission electron micrograph of the tip of the fibrous carbon nanohorn aggregate. The carbon nanohorns collect radially three-dimensionally to form an aggregated structure.

Example 1

50 mg of the sample produced in the production example was heated to 460° C. at a temperature rising rate of 1° C./minute and oxidized in air. Thereafter, the mixture was dispersed in hydrochloric acid and stirred at 70° C. for 2 hours. Cooled to room temperature, washed with water and made into an aqueous dispersion. The dispersion was subjected to ultrasonic treatment at 45 kHz for 15 minutes in a bath type ultrasonic treatment apparatus. The resulting sample was filtered and dried.

FIG. 4 is a scanning electron micrograph of the sample after drying. FIG. 5 is a transmission electron micrograph of the cut tip and a schematic view thereof. Fibrous carbon nanohorn aggregates shorter than 1 μm were observed. The diameter was about 30 nm to 100 nm, which was almost the same as that of the untreated fibrous carbon nanohorn aggregate. As can be seen from FIG. 5, the size and structure of the single-walled carbon nanohorns in the side portions were substantially the same. However, at the tip, the single-walled carbon nanohorn directed in the longitudinal direction is eliminated, resulting in a two-dimensional radial structure. That is, FIG. 6 shows the structure from the longitudinal direction. In addition, it was found that the catalysts inside the fibrous structure were removed because they were hardly observed. The carbon nanotubes were exposed at the center from the cut surface of a part of the shortened fibrous carbon nanohorn aggregate (direction of arrow portion in (b) of FIG. 4). Spherical carbon nanohom aggregates were also observed, but there was no change in size or structure compared to the untreated state (arrow portion in (a) of FIG. 4).

FIG. 6 is a length distribution diagram of the fibrous carbon nanohorn aggregate after the treatment. The length distribution is a distribution in a solution measuring a dispersion liquid obtained by dispersing a processed sample in ethanol by dynamic light scattering method. The main length distribution was 300-900 nm, which was nearly shortened. Also, a distribution of lengths of 5 μm or more is probably a residual shortened or fibrous carbon nanohorn aggregate that could not be shortened.

Example 2

10 mg of the sample prepared in Example 1 was mixed with 10 ml of ethanol, and ultrasonic dispersion was performed for 15 minutes to prepare dispersion A. As a comparative sample, an untreated sample produced in the production example was used, and dispersion B was produced under the same conditions. After 24 hours, as a result of observing the precipitates of the dispersion A and the dispersion B with a scanning electron microscope, there was hardly any fibrous carbon nanohorn aggregate shortened as compared with the untreated fibrous carbon nanohorn aggregate. From this, it was found that the shortened fibrous carbon nanohorn aggregate was highly dispersed and maintained the dispersed state.

Example 3

Dispersion A and dispersion B obtained in Example 2 were dropped onto a silicon substrate and dried. Dropping and drying were repeated until the film thickness reached 1 μm. The obtained thin film was observed with a laser microscope. As a result, a uniform film was formed in both cases, but the thin film produced by using dispersion B was entangled with impurities of graphite to form unevenness. Therefore, it was found that dispersion A was easier to apply to a paste or the like.

The present invention has been described with reference to the Example embodiments and the Examples, but the present invention is not limited to the above Example embodiments and Examples. Various changes that can be understood by those skilled in the art can be made in the configuration and details of the present invention within the scope of the present invention.

This application claims priority to Japanese Patent Application No. 2017-238554, filed Dec. 13, 2017, the entire disclosure of which is incorporated herein by reference.

APPENDIX

The present invention includes the following embodiments.

[Note 1]

A method of shortening a fibrous carbon nanohorn aggregate comprising:

(1) oxidizing a fibrous carbon nanohorn aggregate in which a plurality of single-walled carbon nanohorns are aggregated radially and are connected in a fibrous manner, the fibrous carbon nanohorn aggregate having a length of 1 μm or more and a diameter in the transverse direction in the range of 30 to 100 nm;

(2) agitating the fibrous carbon nanohorn aggregate in an acid solution; and (3) subjecting the fibrous carbon nanohorn aggregate to ultrasonic treatment in a liquid after the step (2).

[Note 2]

The method of shortening a fibrous carbon nanohorn aggregate according to Note 1, wherein the fibrous carbon nanohorn aggregate prior to the process of oxidizing in step (1) includes a catalytic metal particle inside, and the catalytic metal particle is eluted by the agitation in the acid solution in step (2).

[Note 3]

The method for shortening an aggregate of fibrous carbon nanohorns according to Note 1 or 2, wherein the oxidation treatment of step (1) is a step of heat treatment in an atmosphere gas containing oxygen.

[Note 4]

A fibrous carbon nanohorn aggregate in which a plurality of single-walled carbon nanohorns are assembled radially and connected in a fibrous manner, wherein the fibrous carbon nanohorn aggregate has a diameter in the transverse direction in the range of 30 to 100 nm, and at least one end in the longitudinal direction of the fibrous carbon nanohorn aggregate has an end surface on which no tip of the plurality of single-walled carbon nanohorns is disposed toward the longitudinal direction.

[Note 5]

The fibrous carbon nanohorn aggregate according to Note 4, wherein each single-walled carbon nanohorn includes a structure having a diameter of 1 nm to 5 nm, a length of 30 nm to 100 nm, and includes a structure having a horn-like tip.

[Note 6]

The fibrous carbon nanohorn aggregate according to Note 5, wherein the single-walled carbon nanohorn includes a graphene sheet structure.

[Note 7]

A fibrous carbon nanohorn aggregate in which a plurality of single-walled carbon nanohorns are assembled radially and are connected in a fibrous manner, wherein the fibrous carbon nanohorn aggregate has a length less than 1 μm, and at least one end of the fibrous carbon nanohorn aggregate in the longitudinal direction has an end face of a two-dimensional radial structure in which the plurality of single-walled carbon nanohorns are not arranged toward the longitudinal direction.

[Note 8]

The fibrous carbon nanohorn aggregate according to Note 7, wherein the diameter of the fibrous carbon nanohorn aggregate in the transverse direction is in the range of 30 to 100 nm.

[Note 9]

The fibrous carbon nanohorn aggregate according to Note 7 or 8, wherein each single-walled carbon nanohorn includes a structure having a diameter of 1 nm to 5 nm, a length of 30 nm to 100 nm, and a tip of the structure having a horn shape.

[Note 10]

The fibrous carbon nanohorn aggregate according to Note 9, wherein the single-walled carbon nanohorn includes a graphene sheet structure.

[Note 11]

A carbon nanohorn aggregate mixture including the fibrous carbon nanohorn aggregate according to any one of Notes 4 to 10, and at least one type of spherical carbon nanohorn aggregates of a seed-shaped, a bud-shaped, a dahlia-shaped, a petal dahlia-shaped and a petal-shaped one.

[Note 12]

A nanocarbon composite including the fibrous carbon nanohorn aggregate according to any one of Notes 4 to 10, and one or more of carbon nanotubes, carbon fibers, graphene, carbon black, fullerene, graphite, and amorphous carbon.

[Note 13]

A nanocarbon composite including the carbon nanohorn aggregate mixture according to Note 11, and one or more of carbon nanotubes, carbon fibers, graphene, carbon black, fullerenes, graphite, and amorphous carbon.

[Note 14]

An electrode paste in which a fibrous carbon nanohorn aggregate according to any one of Notes 4 to 10 is dispersed in a solvent

[Note 15]

An electrode paste in which the carbon nanohorn aggregate mixture described in Note 11 is dispersed in a solvent.

[Note 16]

An electrode film including the fibrous carbon nanohorn aggregate according to any one of Notes 4 to 10.

[Note 17]

An electrode film including the carbon nanohorn aggregate mixture according to Note 11.

[Note 18]

The electrode film including the nanocarbon composite according to Note 12 or 13.

The invention claimed is:

1. A method of shortening a fibrous carbon nanohorn aggregate comprising:
   (1) oxidizing a fibrous carbon nanohorn aggregate in which a plurality of single-walled carbon nanohorns are aggregated radially and are connected in a fibrous manner, the fibrous carbon nanohorn aggregate having a length of 1 µm or more and a diameter in the transverse direction in the range of 30 to 100 nm;
   (2) agitating the fibrous carbon nanohorn aggregate in an acid solution; and
   (3) subjecting the fibrous carbon nanohorn aggregate to ultrasonic treatment in a liquid after the step (2).

2. The method for shortening a fibrous carbon nanohorn aggregate according to claim 1, wherein the fibrous carbon nanohorn aggregate before the oxidizing of step (1) is performed contains catalyst metal particles therein, and the catalyst metal particles are eluted by stirring in the acid solution of step (2).

3. The method for shortening a fibrous carbon nanohorn aggregate according to claim 1, wherein the oxidizing of step (1) is a step of heat treatment in an atmosphere gas containing oxygen.

4. A fibrous carbon nanohorn aggregate in which a plurality of single-walled carbon nanohorns are assembled radially and connected in a fibrous manner, wherein the fibrous carbon nanohorn aggregate has a diameter in the transverse direction in the range of 30 to 100 nm, and at least one end of the fibrous carbon nanohorn aggregate in the longitudinal direction has an end face of a two-dimensional radial structure in which the plurality of single-walled carbon nanohorns are not arranged toward the longitudinal direction.

5. The fibrous carbon nanohorn aggregate according to claim 4, wherein each single-walled carbon nanohorn includes a structure having a diameter of 1 nm to 5 nm, a length of 30 nm to 100 nm, and a tip of the structure having a horn shape.

6. The fibrous carbon nanohorn aggregate according to claim 5, wherein the single-walled carbon nanohorn includes a graphene sheet structure.

7. A fibrous carbon nanohorn aggregate in which a plurality of single-walled carbon nanohorns are assembled radially and are connected in a fibrous manner, wherein the fibrous carbon nanohorn aggregate has a length less than 1 and at least one end of the fibrous carbon nanohorn aggregate in the longitudinal direction has an end face of a two-dimensional radial structure in which the plurality of single-walled carbon nanohorns are not arranged toward the longitudinal direction.

8. The fibrous carbon nanohorn aggregate according to claim 7, wherein the diameter of the fibrous carbon nanohorn aggregate in the transverse direction is in the range of 30 to 100 nm.

9. The fibrous carbon nanohorn aggregate according to claim 7, wherein each single-walled carbon nanohorn includes a structure having a diameter of 1 nm to 5 nm, a length of 30 nm to 100 nm, and a tip of the structure having a horn shape.

10. The fibrous carbon nanohorn aggregate according to claim 9, wherein the single-walled carbon nanohorn includes a graphene sheet structure.

11. A carbon nanohorn aggregate mixture comprising the fibrous carbon nanohorn aggregate according to claim 4, and at least one type of spherical carbon nanohorn aggregates of a seed-shaped, a bud-shaped, a dahlia-shaped, a petal dahlia-shaped and a petal-shaped one.

12. A nanocarbon composite comprising the fibrous carbon nanohorn aggregate according to claim 4, and one or more of carbon nanotubes, carbon fibers, graphene, carbon black, fullerene, graphite, and amorphous carbon.

13. A nanocarbon composite comprising the carbon nanohorn aggregate mixture according to claim 7, and one or more of carbon nanotubes, carbon fibers, graphene, carbon black, fullerenes, graphite, and amorphous carbon.

14. An electrode paste in which the fibrous carbon nanohorn aggregate according to claim 4 is dispersed in a solvent.

15. An electrode paste in which the carbon nanohorn aggregate mixture according to claim 7 is dispersed in a solvent.

16. An electrode film comprising the fibrous carbon nanohorn aggregate according to claim 4.

17. An electrode film comprising the carbon nanohorn aggregate mixture according to claim 7.

18. An electrode film comprising the nanocarbon composite according to claim 12.

19. A carbon nanohorn aggregate mixture comprising the fibrous carbon nanohorn aggregate according to claim 7, and at least one type of spherical carbon nanohorn aggregates of a seed-shaped, a bud-shaped, a dahlia-shaped, a petal dahlia-shaped and a petal-shaped one.

20. An electrode film comprising the nanocarbon composite according to claim 13.

* * * * *